(12) United States Patent
Xu et al.

(10) Patent No.: US 9,287,950 B2
(45) Date of Patent: *Mar. 15, 2016

(54) CHANNEL QUALITY INDICATOR APPARATUS AND METHOD

(71) Applicant: Microsoft Technology Licensing, LLC, Redmond, WA (US)

(72) Inventors: Hua Xu, Nepean (CA); Dong-Sheng Yu, Ottawa (CA); Ming Jia, Ottawa (CA); Jianglei Ma, Ottawa (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/597,432

(22) Filed: Jan. 15, 2015

(65) Prior Publication Data

US 2015/0124901 A1    May 7, 2015

Related U.S. Application Data

(63) Continuation of application No. 12/491,708, filed on Jun. 25, 2009, now Pat. No. 8,948,799, which is a continuation-in-part of application No. 12/325,545, filed on Dec. 1, 2008, now abandoned.

(60) Provisional application No. 61/012,610, filed on Dec. 10, 2007, provisional application No. 60/991,451, filed on Nov. 30, 2007.

(51) Int. Cl.
*H04W 52/24* (2009.01)
*H04W 72/12* (2009.01)
(Continued)

(52) U.S. Cl.
CPC ............... *H04B 7/0478* (2013.01); *H04B 1/10* (2013.01); *H04B 1/38* (2013.01); *H04B 7/0413* (2013.01); *H04B 7/0632* (2013.01);
(Continued)

(58) Field of Classification Search
CPC .......... H04B 7/06321; H04B 17/0042; H04W 52/241; H04W 72/1226
See application file for complete search history.

(56) References Cited

U.S. PATENT DOCUMENTS

| 8,948,799 | B1 | 2/2015 | Xu et al. |
| 2007/0153928 | A1 | 7/2007 | Liu et al. |

(Continued)

OTHER PUBLICATIONS

"Final Office Action", U.S. Appl. No. 12/491,708, Sep. 24, 2012, 10 pages.

(Continued)

*Primary Examiner* — Andrew Wendell
(74) *Attorney, Agent, or Firm* — Brandon Roper; Judy Yee; Micky Minhas

(57) ABSTRACT

A method and apparatus are provided for a wireless communication system including a base station and at least one user equipment. A Channel Quality Indicator (CQI) table can be generated so that only an index corresponding to the measured CQI needs to be fed back to the base station. The CQI tables proposed herein may be suitable to different channel statistics, different Multiple Input Multiple Output (MIMO) mode and may be optimized based on either performance or implementation complexity. Multiple CQI tables may be formed into one compound CQI table. The CQI tables may be stored at both a base station and user equipment. The base station can select a CQI table from the set of tables. The base station signals the selection of the CQI table to the user equipment and the user equipment feeds back indices from the selected CQI table to the base station.

20 Claims, 24 Drawing Sheets

(51) Int. Cl.
- *H04B 7/04* (2006.01)
- *H04B 1/10* (2006.01)
- *H04B 1/38* (2015.01)
- *H04B 15/00* (2006.01)
- *H04B 17/00* (2015.01)
- *H04L 1/00* (2006.01)
- *H04Q 1/20* (2006.01)
- *H04L 12/26* (2006.01)
- *H04W 24/00* (2009.01)
- *H04B 7/06* (2006.01)

(52) U.S. Cl.
CPC ............ *H04B 7/0689* (2013.01); *H04B 15/00* (2013.01); *H04B 17/00* (2013.01); *H04L 1/00* (2013.01); *H04L 43/0823* (2013.01); *H04Q 1/20* (2013.01); *H04W 24/00* (2013.01)

(56) References Cited

U.S. PATENT DOCUMENTS

| | | |
|---|---|---|
| 2008/0080431 A1 | 4/2008 | Zeira et al. |
| 2009/0036117 A1 | 2/2009 | Sollenberger et al. |
| 2009/0046800 A1 | 2/2009 | Xu et al. |
| 2009/0245408 A1 | 10/2009 | Mujtaba et al. |
| 2010/0311431 A1 | 12/2010 | Papasakellariou et al. |

OTHER PUBLICATIONS

"Final Office Action", U.S. Appl. No. 12/491,708, Jun. 6, 2014, 11 pages.

"Non-Final Office Action", U.S. Appl. No. 12/491,708, Nov. 20, 2013, 11 pages.

"Notice of Allowance", U.S. Appl. No. 12/491,708, Sep. 19, 2014, 6 pages.

"Non-Final Office Action", U.S. Appl. No. 12/491,708, Mar. 29, 2012, 9 pages.

| MCS Index | Modulation | Code Rate | Efficiency |
|---|---|---|---|
| 1 | QPSK | 1/3 | 0.67 |
| 2 | QPSK | 2/5 | 0.80 |
| 3 | QPSK | 1/2 | 1.00 |
| 4 | QPSK | 3/5 | 1.20 |
| 5 | QPSK | 2/3 | 1.33 |
| 6 | 16QAM | 2/5 | 1.60 |
| 7 | 16QAM | 1/2 | 2.00 |
| 8 | 16QAM | 3/5 | 2.40 |
| 9 | 16QAM | 2/3 | 2.67 |
| 10 | 16QAM | 3/4 | 3.00 |
| 11 | 16QAM | 4/5 | 3.20 |
| 12 | 64QAM | 3/5 | 3.60 |
| 13 | 64QAM | 2/3 | 4.00 |
| 14 | 64QAM | 3/4 | 4.50 |
| 15 | 64QAM | 4/5 | 4.80 |
| 16 | 64QAM | 5/6 | 5.00 |

FIG. 4

| MCS Index | Modulation | Code Rate | Effeciency |
|---|---|---|---|
| 1 | QPSK | 1/8 | 0.25 |
| 2 | QPSK | 2/11 | 0.36 |
| 3 | QPSK | 1/5 | 0.4 |
| 4 | QPSK | 1/4 | 0.5 |
| 5 | QPSK | 1/3 | 0.67 |
| 6 | QPSK | 11/30 | 0.73 |
| 7 | QPSK | 2/5 | 0.80 |
| 8 | QPSK | 9/20 | 0.9 |
| 9 | QPSK | 1/2 | 1.00 |
| 10 | QPSK | 11/20 | 1.10 |
| 11 | QPSK | 3/5 | 1.20 |
| 12 | QPSK | 19/30 | 1.27 |
| 13 | QPSK | 2/3 | 1.33 |
| 14 | 16QAM | 2/5 | 1.60 |
| 15 | 16QAM | 9/20 | 1.80 |
| 16 | 16QAM | 1/2 | 2.00 |
| 17 | 16QAM | 11/20 | 2.20 |
| 18 | 16QAM | 3/5 | 2.40 |
| 19 | 16QAM | 19/30 | 2.53 |
| 20 | 16QAM | 2/3 | 2.67 |

FIG. 6

| MCS Index | Modulation | Code Rate | Effeciency |
|---|---|---|---|
| 21 | 16QAM | 17/24 | 2.83 |
| 22 | 16QAM | 3/4 | 3.00 |
| 23 | 16QAM | 31/40 | 3.10 |
| 24 | 16QAM | 4/5 | 3.20 |
| 25 | 64QAM | 3/5 | 3.60 |
| 26 | 64QAM | 19/30 | 3.8 |
| 27 | 64QAM | 2/3 | 4.00 |
| 28 | 64QAM | 17/24 | 4.25 |
| 29 | 64QAM | 3/4 | 4.50 |
| 30 | 64QAM | 31/40 | 465 |
| 31 | 64QAM | 4/5 | 4.80 |
| 32 | 64QAM | 5/6 | 5.00 |

FIG. 7

| MCS Index | Modulation | Code Rate | Effeciency |
|---|---|---|---|
| 1 | QPSK | 1/8 | 0.25 |
| 2 | QPSK | 1/6 | 0.33 |
| 3 | QPSK | 1/5 | 0.4 |
| 4 | QPSK | 1/4 | 0.5 |
| 5 | QPSK | 1/3 | 0.67 |
| 6 | QPSK | 3/8 | 0.75 |
| 7 | QPSK | 2/5 | 0.80 |
| 8 | QPSK | 4/9 | 0.89 |
| 9 | QPSK | 1/2 | 1.00 |
| 10 | QPSK | 5/9 | 1.11 |
| 11 | QPSK | 3/5 | 1.20 |
| 12 | QPSK | 2/3 | 1.33 |
| 13 | 16QAM | 2/5 | 1.60 |
| 14 | 16QAM | 4/9 | 1.77 |
| 15 | 16QAM | 1/2 | 2.00 |
| 16 | 16QAM | 5/9 | 2.22 |
| 17 | 16QAM | 3/5 | 2.40 |
| 18 | 16QAM | 5/8 | 2.50 |
| 19 | 16QAM | 2/3 | 2.67 |
| 20 | 16QAM | 5/7 | 2.86 |

FIG. 9

| MCS Index | Modulation | Code Rate | Effeciency |
|---|---|---|---|
| 21 | 16QAM | 3/4 | 3.00 |
| 22 | 16QAM | 7/9 | 3.11 |
| 23 | 16QAM | 4/5 | 3.20 |
| 24 | 16QAM | 5/6 | 3.33 |
| 25 | 64QAM | 3/5 | 3.60 |
| 26 | 64QAM | 5/8 | 3.75 |
| 27 | 64QAM | 2/3 | 4.00 |
| 28 | 64QAM | 5/7 | 4.28 |
| 29 | 64QAM | 3/4 | 4.50 |
| 30 | 64QAM | 7/9 | 4.66 |
| 31 | 64QAM | 4/5 | 4.80 |
| 32 | 64QAM | 5/6 | 5.00 |

FIG. 10

| MCS Index | Modulation | Code Rate | Efficiency |
|---|---|---|---|
| 1 | QPSK | 1/3 | 0.67 |
| 2 | QPSK | 2/5 | 0.80 |
| 3 | QPSK | 1/2 | 1.00 |
| 4 | QPSK | 3/5 | 1.20 |
| 5 | QPSK | 2/3 | 1.33 |
| 6 | 16QAM | 3/7 | 1.71 |
| 7 | 16QAM | 1/2 | 2.00 |
| 8 | 16QAM | 3/5 | 2.40 |
| 9 | 16QAM | 2/3 | 2.67 |
| 10 | 64QAM | 1/2 | 3.00 |
| 11 | 64QAM | 5/9 | 3.33 |
| 12 | 64QAM | 3/5 | 3.60 |
| 13 | 64QAM | 2/3 | 4.00 |
| 14 | 64QAM | 3/4 | 4.50 |
| 15 | 64QAM | 4/5 | 4.80 |
| 16 | 64QAM | 5/6 | 5.00 |

FIG. 12

| MCS Index | Modulation | Code Rate | Effeciency |
|---|---|---|---|
| 1 | QPSK | 1/8 | 0.25 |
| 2 | QPSK | 2/11 | 0.36 |
| 3 | QPSK | 1/5 | 0.4 |
| 4 | QPSK | 1/4 | 0.5 |
| 5 | QPSK | 1/3 | 0.67 |
| 6 | QPSK | 11/30 | 0.73 |
| 7 | QPSK | 2/5 | 0.80 |
| 8 | QPSK | 9/20 | 0.9 |
| 9 | QPSK | 1/2 | 1.00 |
| 10 | QPSK | 11/20 | 1.10 |
| 11 | QPSK | 3/5 | 1.20 |
| 12 | QPSK | 19/30 | 1.27 |
| 13 | QPSK | 2/3 | 1.33 |
| 14 | 16QAM | 3/7 | 1.71 |
| 15 | 16QAM | 13/28 | 1.86 |
| 16 | 16QAM | 1/2 | 2.00 |
| 17 | 16QAM | 11/20 | 2.20 |
| 18 | 16QAM | 3/5 | 2.40 |
| 19 | 16QAM | 19/30 | 2.53 |
| 20 | 16QAM | 2/3 | 2.67 |

FIG. 14

| MCS Index | Modulation | Code Rate | Effeciency |
|---|---|---|---|
| 21 | 64QAM | 1/2 | 3.00 |
| 22 | 64QAM | 19/36 | 3.17 |
| 23 | 64QAM | 5/9 | 3.33 |
| 24 | 64QAM | 26/45 | 3.47 |
| 25 | 64QAM | 3/5 | 3.60 |
| 26 | 64QAM | 19/30 | 3.8 |
| 27 | 64QAM | 2/3 | 4.00 |
| 28 | 64QAM | 17/24 | 4.25 |
| 29 | 64QAM | 3/4 | 4.50 |
| 30 | 64QAM | 31/40 | 4.65 |
| 31 | 64QAM | 4/5 | 4.80 |
| 32 | 64QAM | 5/6 | 5.00 |

FIG. 15

| MCS Index | Modulation | Code Rate | Effeciency |
|---|---|---|---|
| 1 | QPSK | 1/8 | 0.25 |
| 2 | QPSK | 1/6 | 0.33 |
| 3 | QPSK | 1/5 | 0.4 |
| 4 | QPSK | 1/4 | 0.5 |
| 5 | QPSK | 1/3 | 0.67 |
| 6 | QPSK | 3/8 | 0.75 |
| 7 | QPSK | 2/5 | 0.80 |
| 8 | QPSK | 4/9 | 0.89 |
| 9 | QPSK | 1/2 | 1.00 |
| 10 | QPSK | 5/9 | 1.11 |
| 11 | QPSK | 3/5 | 1.20 |
| 12 | QPSK | 5/8 | 1.25 |
| 13 | QPSK | 2/3 | 1.33 |
| 14 | QPSK | 7/10 | 1.40 |
| 15 | 16QAM | 3/7 | 1.71 |
| 16 | 16QAM | 1/2 | 2.00 |
| 17 | 16QAM | 5/9 | 2.22 |
| 18 | 16QAM | 3/5 | 2.40 |
| 19 | 16QAM | 5/8 | 2.50 |
| 20 | 16QAM | 2/3 | 2.67 |

FIG. 17

| MCS Index | Modulation | Code Rate | Effeciency |
|---|---|---|---|
| 21 | 16QAM | 7/10 | 2.80 |
| 22 | 64QAM | 1/2 | 3.00 |
| 23 | 64QAM | 5/9 | 3.33 |
| 24 | 64QAM | 4/7 | 3.43 |
| 25 | 64QAM | 3/5 | 3.60 |
| 26 | 64QAM | 5/8 | 3.75 |
| 27 | 64QAM | 2/3 | 4.00 |
| 28 | 64QAM | 5/7 | 4.28 |
| 29 | 64QAM | 3/4 | 4.50 |
| 30 | 64QAM | 7/9 | 4.66 |
| 31 | 64QAM | 4/5 | 4.80 |
| 32 | 64QAM | 5/6 | 5.00 |

FIG. 18

| MCS Index | Modulation | Code Rate | Effeciency |
|---|---|---|---|
| 1 | QPSK | 1/3 | 0.67 |
| 2 | QPSK | 2/5 | 0.80 |
| 3 | QPSK | 1/2 | 1.00 |
| 4 | QPSK | 3/5 | 1.20 |
| 5 | QPSK | 2/3 | 1.33 |
| 6 | 16QAM | 1/3 | 1.33 |
| 7 | 16QAM | 2/5 | 1.60 |
| 8 | 16QAM | 1/2 | 2.00 |
| 9 | 16QAM | 3/5 | 2.40 |
| 10 | 16QAM | 2/3 | 2.67 |
| 11 | 16QAM | 3/4 | 3.00 |
| 12 | 16QAM | 4/5 | 3.20 |
| 13 | 64QAM | 8/15 | 3.20 |
| 14 | 64QAM | 3/5 | 3.60 |
| 15 | 64QAM | 2/3 | 4.00 |
| 16 | 64QAM | 3/4 | 4.50 |
| 17 | 64QAM | 4/5 | 4.80 |
| 18 | 64QAM | 5/6 | 5.00 |

FIG. 22

| MCS Index | Modulation | Code Rate | Effeciency |
|---|---|---|---|
| 1 | QPSK | 1/3 | 0.67 |
| 2 | QPSK | 2/5 | 0.80 |
| 3 | QPSK | 1/2 | 1.00 |
| 4 | QPSK | 3/5 | 1.20 |
| 5 | QPSK | 2/3 | 1.33 |
| 6 | 16QAM | 1/3 | 1.33 |
| 7 | 16QAM | 2/5 | 1.60 |
| 8 | 16QAM | 1/2 | 2.00 |
| 9 | 16QAM | 3/5 | 2.40 |
| 10 | 16QAM | 2/3 | 2.67 |
| 11 | 16QAM | 3/4 | 3.00 |
| 12 | 16QAM | 4/5 | 3.20 |
| 13 | 64QAM | 8/15 | 3.20 |
| 14 | 64QAM | 3/5 | 3.60 |
| 15 | 64QAM | 2/3 | 4.00 |
| 16 | 64QAM | 3/4 | 4.50 |
| 17 | 64QAM | 4/5 | 4.80 |
| 18 | 64QAM | 5/6 | 5.00 |

FIG. 23

CHANNEL QUALITY INDICATOR APPARATUS AND METHOD

RELATED APPLICATIONS

This application is a continuation of and claims priority under 35 U.S.C. §120 to U.S. patent application Ser. No. 12/491,708, filed on Jun. 25, 2009 which in turn is a continuation in part of U.S. patent application Ser. No. 12/325,545, filed on Dec. 1, 2008, which claims the benefit of U.S. Provisional Patent Application Ser. No. 60/991,451, filed on Nov. 30, 2007 and U.S. Provisional Patent Application Ser. No. 61/012,610, filed on Dec. 10, 2007, the disclosures of which are incorporated by reference herein in their entirety.

BACKGROUND

In a wireless communication system, a base station makes decisions regarding Modulation and Coding Scheme (MCS) selection and user equipment scheduling based on the quality of the data channel between the base station and the user equipment. To this end, the user equipment measures information about the channel quality and feeds back this information to the base station. This channel quality information is referred to as Channel Quality Indicator (CQI). CQI values can be defined in a number of ways. For example, CQI values may be defined by the Signal-to-Noise Ratio (SNR) measured by user equipment. CQI values may also be defined as the maximum MCS level supported by the measured SNR (i.e. the MCS level with the highest spectral efficiency and an acceptable error rate). An MCS level refers to such modulation information as the modulation order and code rate.

It may be desirable to reduce the feedback overhead between a base station and user equipment to maximize performance of a wireless communication system. In order to reduce the CQI feedback overhead, a CQI table can be utilized by the base station and user equipment. A CQI table contains CQI indices which are indicative of measured CQI values such as SNR. The user equipment then only needs to feed back CQI indices to the base station in order to provide the base station with information about channel quality. Sending CQI indices rather than actual CQI values can reduce the feedback overhead.

As mentioned above, CQI indices may be defined as the maximum MCS level supported by a measured SNR. However, the maximum MCS level supported for a given SNR depends on factors such as channel statistic and Multiple-Input Multiple-Output (MIMO) transmission mode. For a given SNR, the maximum MCS level supported in one channel type may not be the same maximum MCS level supported for another channel type. Thus, for different channel statistics and MIMO transmission modes, different CQI tables may be needed to fully exploit the system capacity.

CQI methods, such as those discussed above may be utilized in a 3rd Generation Partnership Project (3GPP) wireless communication system such as a Long Term Evolution (LTE) downlink system. Guidelines for generating CQI tables are discussed in 3GPP Specification TS 36.213, the entire contents of which are incorporated by reference. Section 7.2.3 of 3GPP Specification TS 36.213 discusses and describes the definition of CQI and CQI tables. Guidelines for generating CQI tables have been agreed upon in 3GPP RAN1 meeting #51. For example, one such guideline is that a CQI index is defined in terms of a code rate and modulation, such as Quadrature Phase-Shift Keying (QPSK), 16-Quadrature Amplitude Modulation (16QAM), and 54-Quadrature Amplitude Modulation (64QAM).

SUMMARY

According to an aspect, there is provided a method of generating multiple CQI tables, wherein each table is generated for a different channel statistic and/or MIMO transmission mode. According to another aspect, there is provided a method for a base station to select one of a plurality of CQI tables, for use in communication with user equipment, wherein the selected CQI table was generated for a channel statistic and/or MIMO transmission mode that best fits current channel conditions.

As discussed in the background section, a CQI table contains CQI indices corresponding to measured CQI values such as SNR. CQI indices may also correspond to the maximum MCS level supported by the measured SNR. An MCS level refers to such MCS information as the modulation order and code rate. The maximum supported MCS level is the level with the greatest spectral efficiency at which an acceptable Block Error Rate (BLER) is expected for the measured SNR. Therefore, in a CQI table, according to some embodiments, a CQI index may also be referred to as a MCS index. The complete set of MCS levels utilized in a CQI table is referred to as the Modulation and Coding Set (MCS set).

The relationship between SNR and the expected BLER depends on various channel factors. These factors include the channel statistic, including physical channel characteristics such as Additive White Gaussian Noise (AWGN) or fading channel. In MIMO wireless systems, the SNR versus BLER relationship may also depend on the particular MIMO configuration used by the base station and user equipment. Therefore, the maximum MCS level supported for a given SNR also depends on factors such as channel statistic and MIMO mode. However, it may be difficult to optimize one CQI table for different channels to maximize the system performance. In addition, using one CQI table for different channels could also lead to larger CQI feedback overhead and higher implementation complexity.

Thus, in order to improve performance, it may be advantageous to generate multiple CQI tables which are each generated for a different channel statistic and/or MIMO mode.

In accordance with some aspects, two important criteria should be taken into account when generating CQI tables. First, a CQI table may be generated to be performance-orientated. A performance-oriented CQI table is generated to optimize the performance of the wireless communication system by using an MCS set with equal CQI distribution (i.e. SNR distribution). That is, CQI indices correspond to evenly distributed points along the desired SNR working range. To optimize performance in this way, the MCS set is selected such that, for a desired error rate, the MCS set includes MCS levels suitable to provide the desired error rate at approximately evenly stepped SNR values over the whole SNR working range.

Second, a CQI table may be generated to be complexity-orientated. A complexity-oriented CQI table is generated to minimize the implementation complexity by selecting an MCS set which is, relatively, more easily implemented than other MCS sets (i.e. the "easy-implemented" MCS set). For example, achieving the necessary code rate for certain MCS levels may result in a higher implementation complexity or difficulty. Therefore, in order to reduce complexity, MCS sets may be chosen that contain code rates that are less difficult to achieve.

The design of CQI tables should also consider a number of factors such as the desired SNR working range, feedback granularity, channel statistic, such as AWGN or a fading channel, and MIMO configuration. The feedback granularity refers to an amount of available time and frequency resources used for generating a feedback.

In accordance with some aspects, there is provided several representative CQI tables which can be applied to different deployment scenarios, such as different channel statistics, MIMO transmission modes etc. These tables are optimized based on either performance or implementation complexity. This set of example tables includes:

i. One CQI table for an AWGN channel (25 entry);
ii. Three CQI tables for Transmit Diversity (TxD) in a fading channel (16 and 32 entries); and
iii. Three CQI tables for Spatial Multiplexing (SM) in fading channel (16 and 32 entries).

The number of CQI indices and corresponding MCS levels in a CQI table is referred to as the size of the CQI table. Different CQI table sizes (16, 25 and 32 entries) are provided, according to some aspects, to suit different SNR working ranges, implementation complexity, and CQI feedback overhead. As will be apparent to one skilled in the art, CQI tables generated in accordance with the method described herein are not limited to the sizes of example tables disclosed herein and other sizes may be possible.

Some alternatives CQI tables have also been disclosed herein as further examples.

It may be advantageous for a base station to be able to select between multiple CQI tables, wherein each table is optimized for a different channel, for communication with user equipment. Thus, in accordance with some aspects, a set of CQI tables, including those disclosed herein may be stored at both the base station and the user equipment. These tables may be pre-entered into both the base station and the user equipment during manufacturing. Alternatively, the tables may be pre-entered in the base station and subsequently downloaded from the base station by the user equipment at initialization. The base station may select a CQI table from the set of CQI tables based on channel conditions or implementation requirements received by or otherwise known to the base station. Such channel conditions may include an estimated channel statistic, sub-channel assignment of the user equipment by the base station; and/or MIMO transmission mode. Implementation requirements may include a desired implementation complexity and/or CQI feedback overhead.

According to some aspects, the base station may obtain channel statistic information from the user equipment feedback and decide which CQI table to use based on the channel statistic. The base station may also select which CQI table to use based on the current MIMO transmission mode. The base station may also decide which CQI table to use based on sub-channel assignments.

In accordance with some aspects, the base station signals the selection of the CQI table to the user equipment. The user equipment makes CQI measurements and feeds back CQI indices corresponding to those measurements to base station based on the CQI table selected.

According to one aspect, there is provided a method comprising: generating a plurality of channel quality indicator (CQI) tables, each table comprising a set of indices, each index corresponding to a respective modulation and coding scheme (MCS) level and to a respective measured signal-to-noise ratio, and for each table, the MCS levels being chosen based on expected block error rates for a respective channel statistic and/or Multiple-Input Multiple-Output (MIMO) transmission mode.

According to another aspect, there is provided a method of operating a wireless communication system comprising: storing a plurality of channel quality indicator (CQI) tables at a base station and one or more user equipment, each table comprising a set of indices, each index corresponding to a respective modulation and coding scheme (MCS) level and to a respective measured signal-to-noise ratio, and for each table, the MCS levels being chosen based on expected block error rates for a respective channel statistic and/or Multiple-Input Multiple-Output (MIMO) transmission mode; and the base station selecting one of the plurality of tables for use in communication with the one or more user equipment; the base station signalling the selection of the table to the one or more user equipment; and the one or more user equipment measuring CQI values and feeding back indices corresponding to the measured CQI values to the base station based on the selected table.

According to still another aspect, there is provided an apparatus in a base station, the apparatus comprising a storage device for storing a plurality of channel quality indicator (CQI) tables, each table comprising a set of indices, each index corresponding to a respective modulation and coding scheme (MCS) level and to a respective measured signal-to-noise ratio, and for each table, the MCS levels being chosen based on expected block error rates for a respective channel statistic and/or Multiple-Input Multiple-Output (MIMO) transmission mode; a module for selecting one of the plurality of tables; a module for signalling the selection of the table to at least one user equipment; and a module for receiving CQI indices from the selected table fed back from the at least one user equipment.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which:

FIG. 4 is a representative 16-entry CQI table for transmit diversity (TxD) Spatial Frequency Block Coding (SFBC) in a fading channel according to some embodiments;

FIGS. 6 and 7 are a representative 32-entry CQI table for TxD (SFBC) in a fading channel according to some embodiments;

FIGS. 9 and 10 are a representative alternative 32-entry CQI table for TxD (SFBC) in a fading channel according to some embodiments;

FIG. 12 is a representative 16-entry CQI table for Spatial Multiplexing (SM) in a fading channel according to some embodiments;

FIGS. 14 and 15 are a representative 32-entry CQI table for SM in a fading channel according to some embodiments;

FIGS. 17 and 18 are a representative alternative 32-entry CQI table for SM in a fading channel according to some embodiments;

FIG. 22 is a representative example "one-to-multiple" compound CQI table according to some embodiments;

FIG. 23 is a representative example "one-to-multiple" compound CQI table according to some embodiments;

DETAILED DESCRIPTION

Overview

Optimization of CQI tables can vary for different channel statistics and MIMO transmission modes. Furthermore, CQI tables can be optimized based on performance or implementation complexity. Therefore, as described herein, it may be advantageous to generate multiple CQI tables for use in a wireless communication system, wherein the tables are each generated for different possible channel statistics and/or MIMO transmission modes. When multiple CQI tables are generated, a base station may select one of the CQI tables to use that best fits the channel between the base station and user equipment.

A method of generating multiple CQI tables according to an aspect will now be described in detail. Examples of CQI tables generated in accordance with this method are also disclosed.

Figure 1:
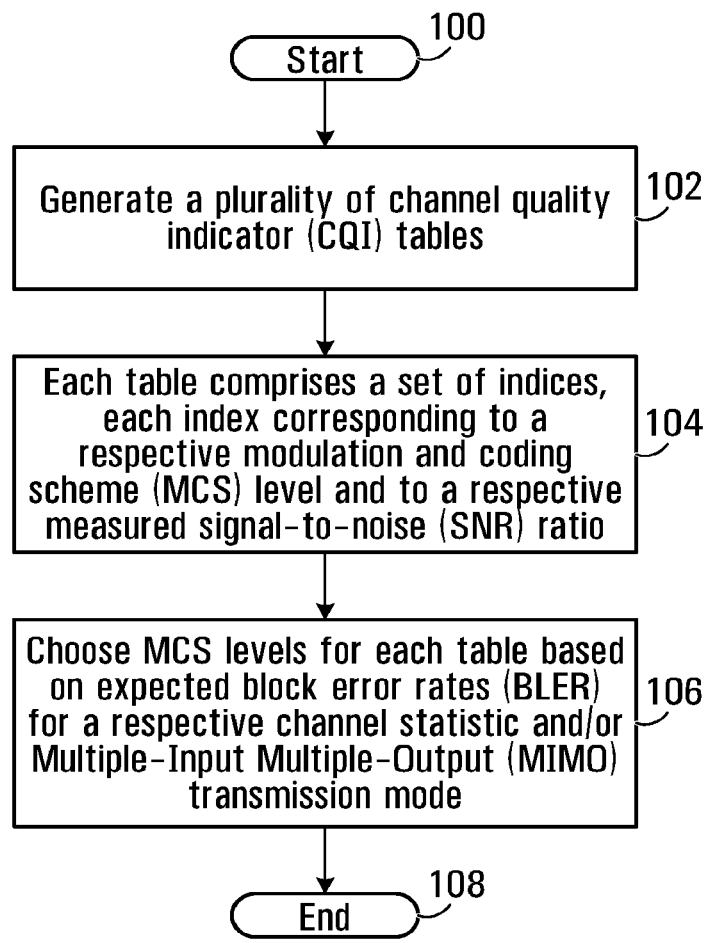
FIG. 1 is a flowchart of steps for generating CQI tables used in some embodiments.

FIG. 1 is a flowchart of steps for generating CQI tables according to some embodiments. At step 100, the process begins. At step 102 a plurality of CQI tables is generated. At step 104, these CQI tables comprise a set of indices, each index corresponding to a MCS level and to a respective measured signal-to-noise ratio. In a CQI table, CQI indices may correspond to respective maximum MCS levels which provide acceptable BLERs at given SNR points. The expected BLER at a given SNR may depend on the channel statistic and/or MIMO transmission mode. Therefore, at step 106, for each table, the MCS levels are chosen based on expected BLERs for a respective channel statistic and/or MIMO transmission mode. For example, one of the multiple tables may be generated for an AWGN channel. MCS corresponding to MCS indices for such a table would be chosen based on the relationship between BLER and SNR in a AWGN channel. At step 108, the process ends.

FIGS. 2, 4, 6-7, 9-10, 12, 14-15, and 17-18 are representative examples of CQI tables which are generated in accordance with the method described above, and which may be utilized, according to some aspects, for different deployment scenarios. These example tables may be generated for various different channel statistics and MIMO transmission modes and may be optimized for either performance or implementation complexity. In these tables, each CQI index corresponds to a maximum MCS level supported by a measured SNR. Each MCS level includes a modulation order and code rate. In FIGS. 2 to 20, CQI indices are referred to as MCS indices. FIGS. 3, 5, 8, 11, 13, 16 and 19 show link level Block Error Rate (BLER) vs. SNR curves corresponding to the tables in FIGS. 2, 4, 6-7, 9-10, 12, 14-15, and 17-18 respectively. Each of the CQI tables and BLER v. SNR curves shown in FIGS. 2 to 20 will now be described in more detail.

Figure 2:
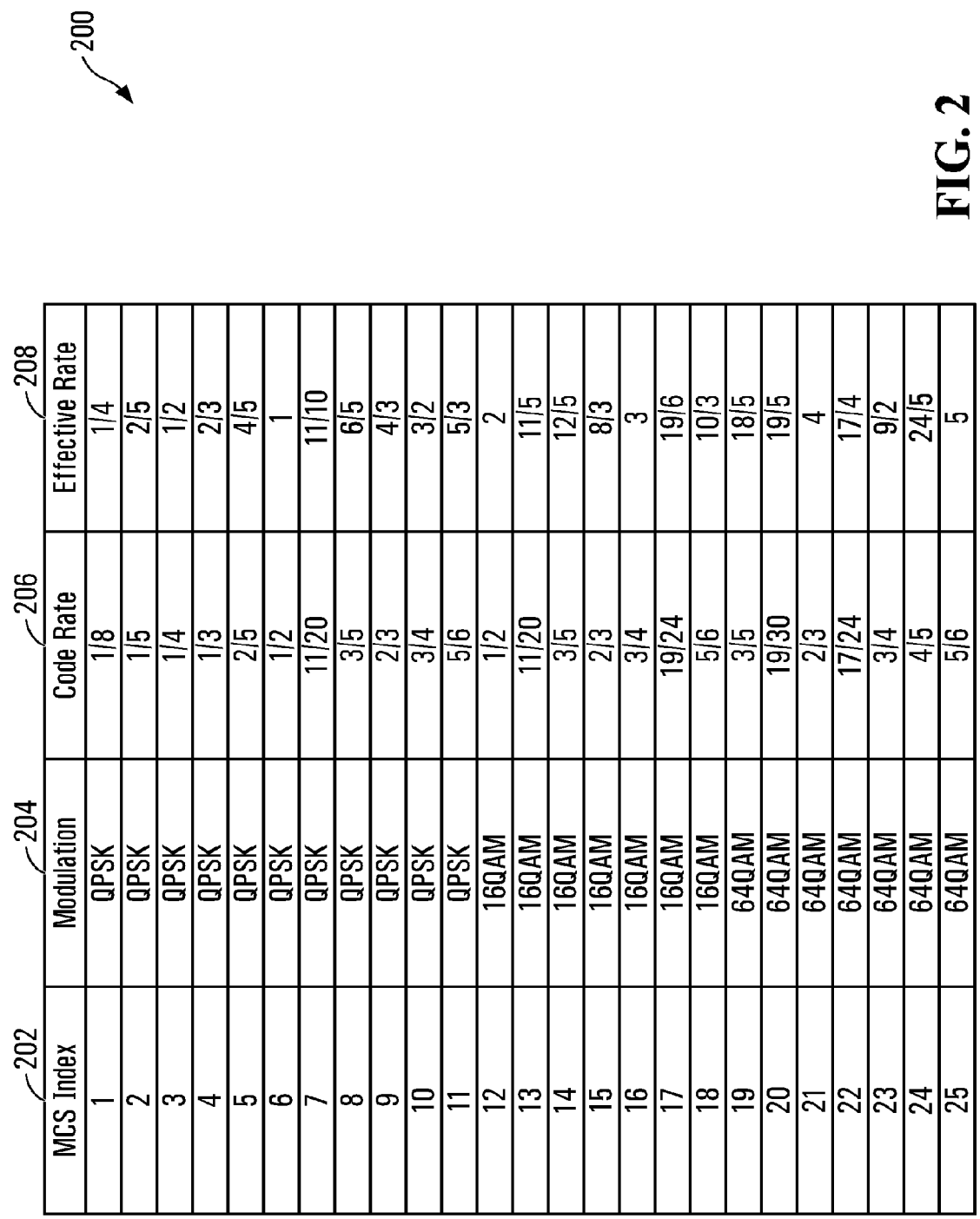
FIG. 2 is a representative 25-entry CQI table for an Additive Gaussian White Noise (AWGN) channel according to some embodiments.

FIG. 2 is a representative 25-entry CQI table 200 for an additive White Gaussian Noise (AWGN) channel according to some embodiments. The CQI table 200 shows a set of MCS indices 202, and corresponding modulation order 204 and code rates 206. Each MCS index corresponds to an MCS level (modulation order and code rate). Each MCS level has an effective rate 208, which corresponds to the spectral efficiency of that MCS level. The effective rate 208 of an MCS level in FIG. 2 is a function of the code rate 206 and the number of bits/symbol of a given modulation order 204. For example, for an MCS index of 1, a Quadrature Phase-Shift Keying (QPSK) modulation, which utilizes two bits/symbol, is used at a code rate of ⅛. Two bits/symbol multiplied by ⅛ gives an effective rate of ¼. 16-Quadrature Amplitude Modulation (16QAM) utilizes 425 bits/symbol, and 64-Quadrature Amplitude Modulation (64QAM) utilizes 6 bits/symbol. Therefore, as seen in FIG. 2, 16QAM at a code rate of ½ gives an effective rate of 2, while 64QAM at a code rate of ⅔ gives an effective rate of 4.

Figure 3:
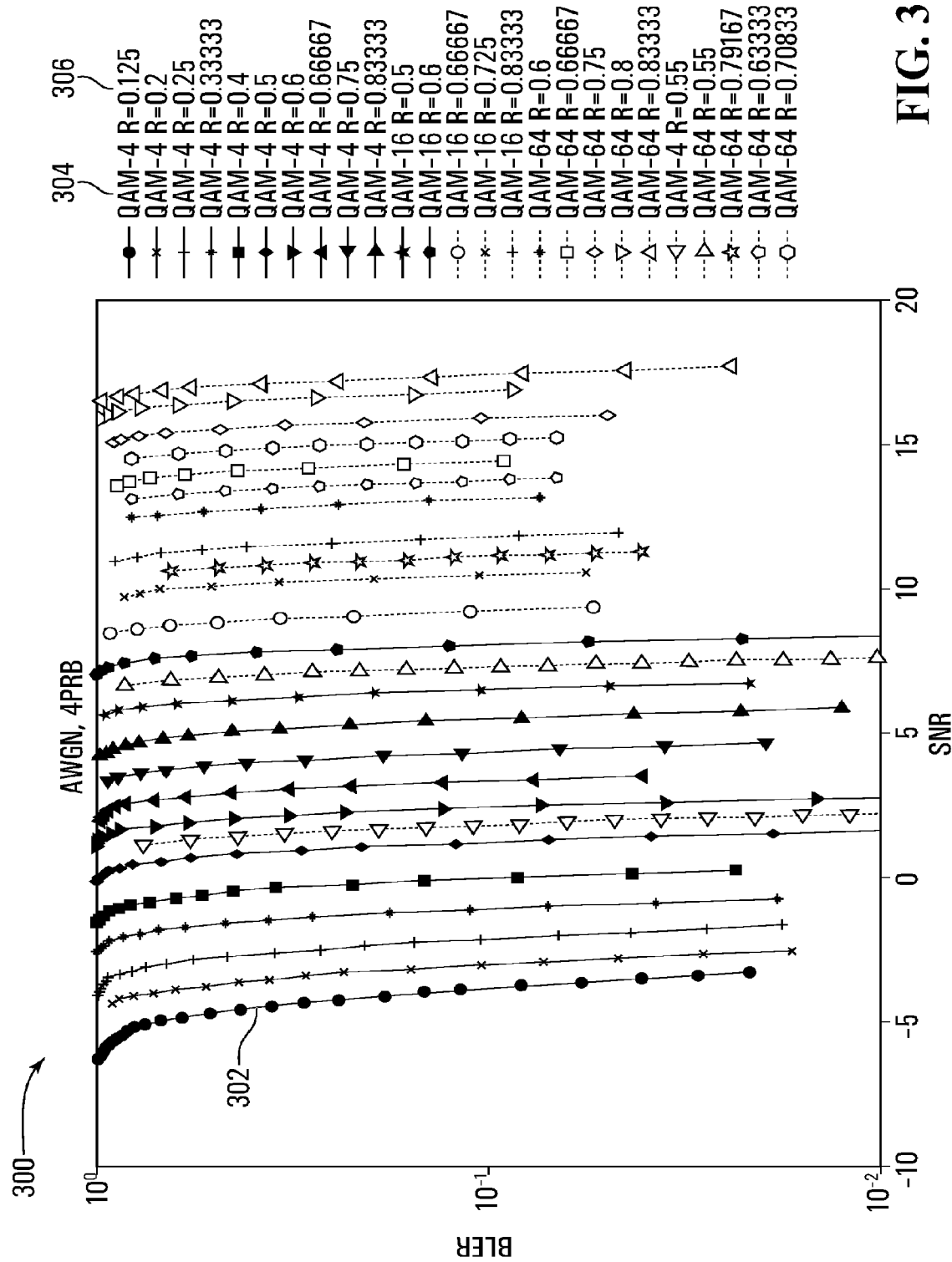
FIG. 3 is a diagram of representative Block Error Rate (BLER) vs. Signal-to-Noise Ratio (SNR) curves for 25-entry CQI table for AWGN according to some embodiments.

FIG. 3 is a diagram of a set of link level BLER vs. SNR curves 300 for the MCS set on which CQI table 200 in FIG. 2 is based. Each MCS index in FIG. 2 corresponds to some SNR value on the x-axis in FIG. 3. Each curve in FIG. 3 corresponds to an MCS level in FIG. 2. For example, curve 302 corresponds to a QPSK modulation and a code rate of ⅛ (0.125). Curve 302 shows how the Block Error Rate (BLER) and SNR relate for this modulation order and code rate. For a given BLER (such as 1 o-1), a given discrete SNR value has a corresponding maximum MCS level (corresponding to an MCS index) supporting the desired BLER. The curves 300 of FIG. 3 cover the whole working SNR range from −4 dB to 18 dB equally with a step of approximately 1 dB. These curves 300 show an equal coverage of the working SNR range corresponding to FIG. 2.

The representative CQI tables shown in FIGS. 4, 6-7, 9-10, 12, 14-15, and 17-18 are generated by the BLER v. SNR curves shown in FIGS. 5, 8, 10 11, 13, 16 and 19. The relationship between the BLER v. SNR curves shown in FIGS. 5, 8, 11, 13, 16 and 19 and the CQI tables shown in FIGS. 4, 6-7, 9-10, 12, 14-15, and 17-18 is similar as that described in respect of FIGS. 2 and 3 above.

Figure 5:
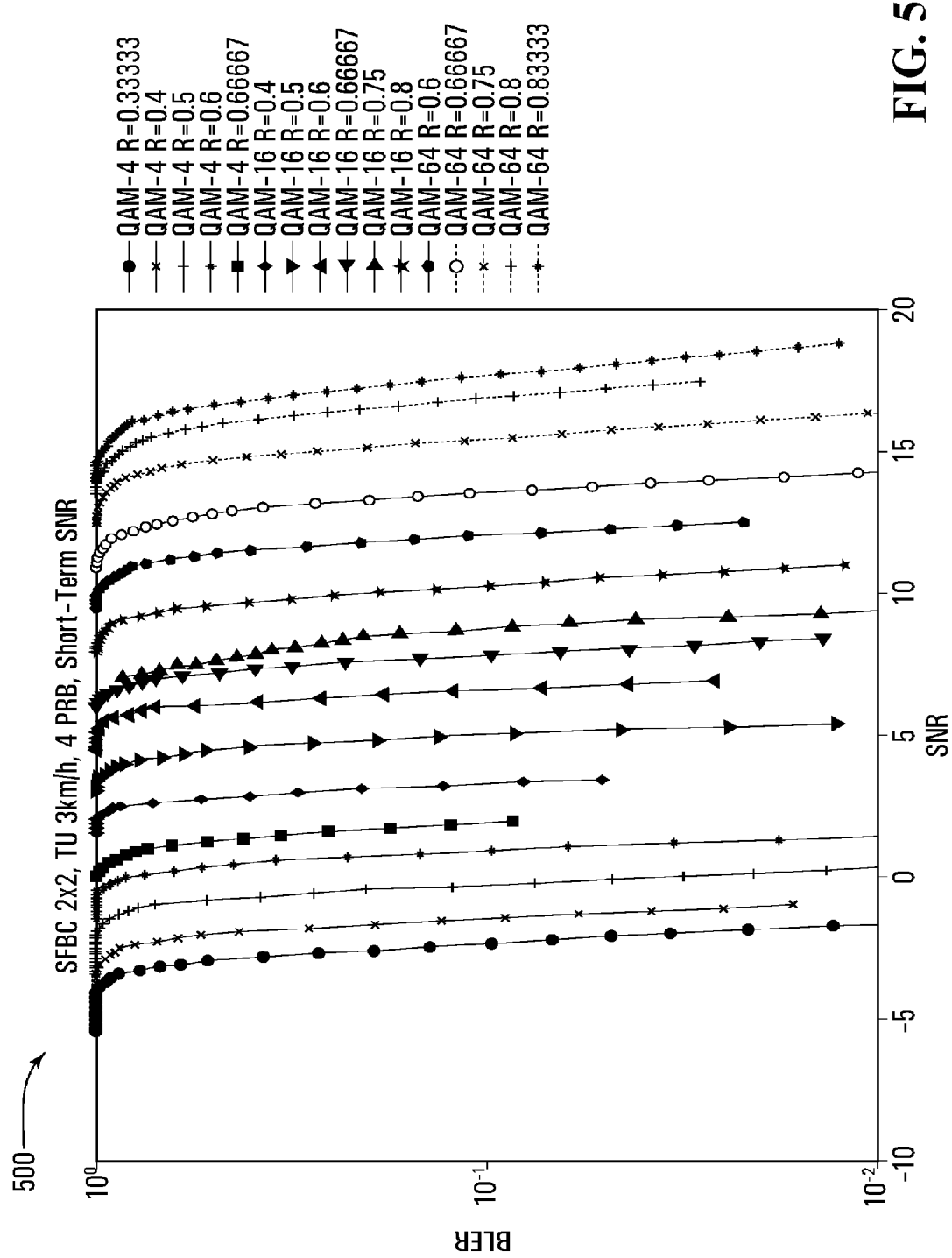
FIG. 5 is a diagram of representative BLER vs. SNR curves for 16-entry CQI table for TxD in a fading channel according to some embodiments.
Figure 8:
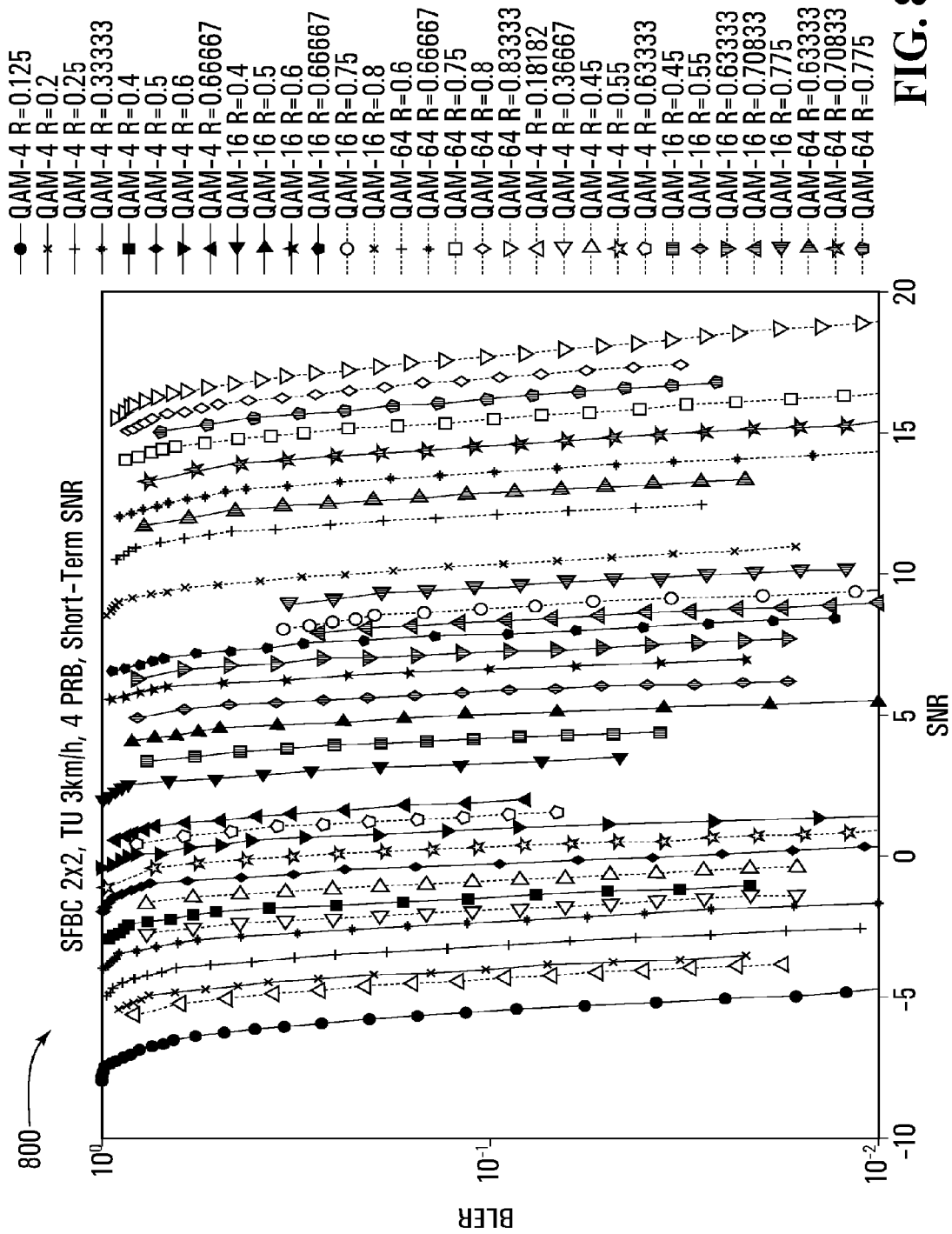
FIG. 8 is a diagram of representative BLER vs. SNR curves for 32-entry CQI table for TxD in a fading channel according to some embodiments.

FIG. 4 is a representative 16-entry CQI table 400 generated for Transmit Diversity (TxD) Spatial Frequency Block Coding (SFBC) in a fading channel according to some embodiments. This table 400 was generated by a set of link level BLER vs. SNR curves 500 for a fading channel shown in FIG. 5. The curves 500 in FIG. 5 show the equal coverage of the working SNR range.

FIGS. 6 and 7 are a representative 32-entry CQI table 600/700 generated for TxD (SFBC) in fading channel according to some embodiments. This table 600/700 was generated by a set of link level BLER vs. SNR curves 800 shown in FIG. 8 for a fading channel. The curves 800 in FIG. 8 cover the working SNR range from −5 dB to 19 dB equally with the step of approximately 1 dB, in which transmit diversity mode is assumed.

Figure 11:
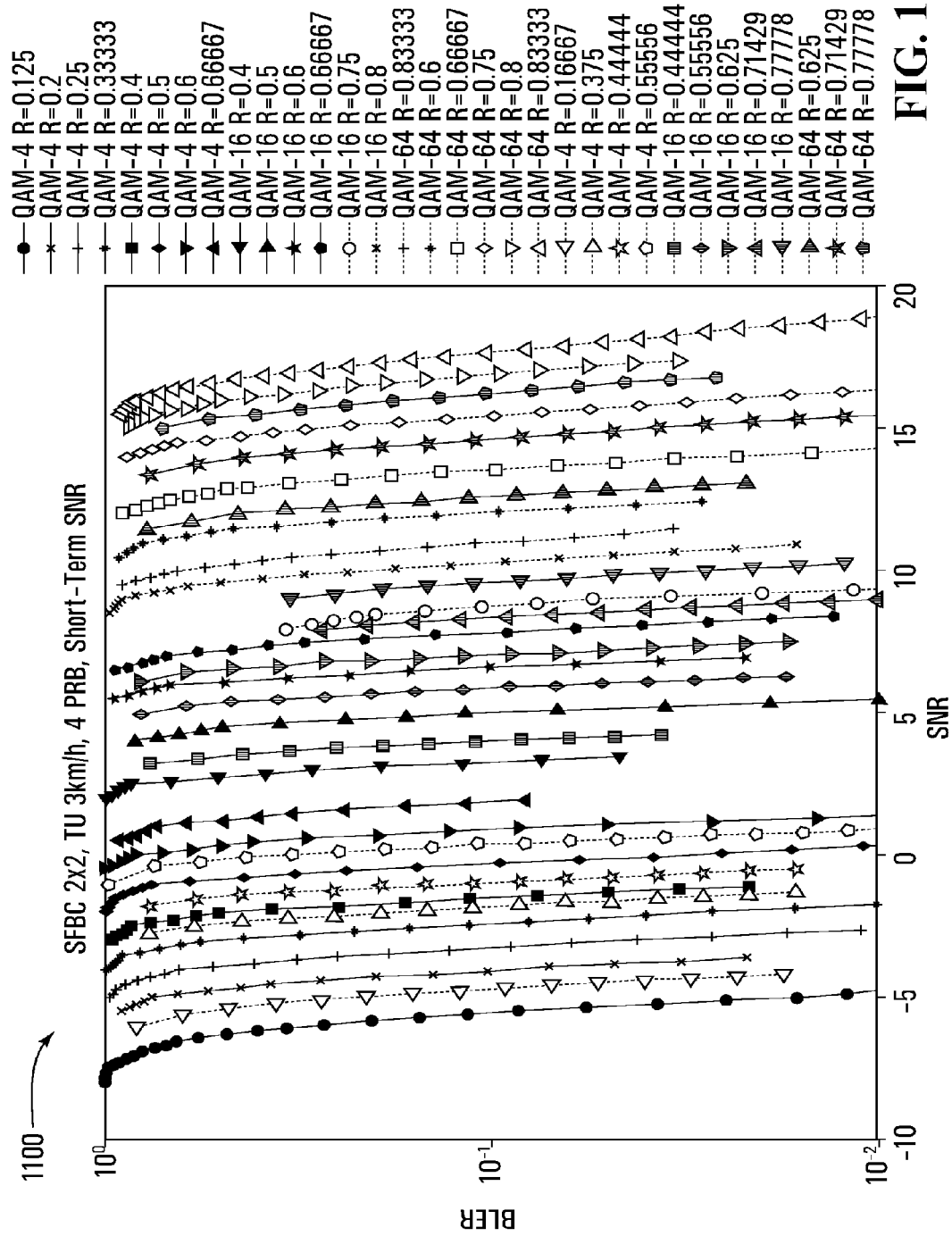
FIG. 11 is a diagram of representative BLER vs. SNR curves for the alternative 32-entry CQI table for TxD in a fading channel according to some embodiments.

FIGS. 9 and 10 are a representative alternative 32-entry CQI table 900/1000 for TxD (SFBC) in fading channel according to some embodiments. This table 900/1000 was generated by a set of link level BLER vs. SNR curves for fading channel which cover the working SNR range from −5 dB to 19 dB with less implementation complexity, in which transmit diversity mode is assumed. FIG. 11 is a diagram of the corresponding link level BLER vs. SNR curves 1100 for the alternative 32-entry CQI table 900/1000 for TxD in fading channel of FIGS. 9 and 10.

Figure 13:
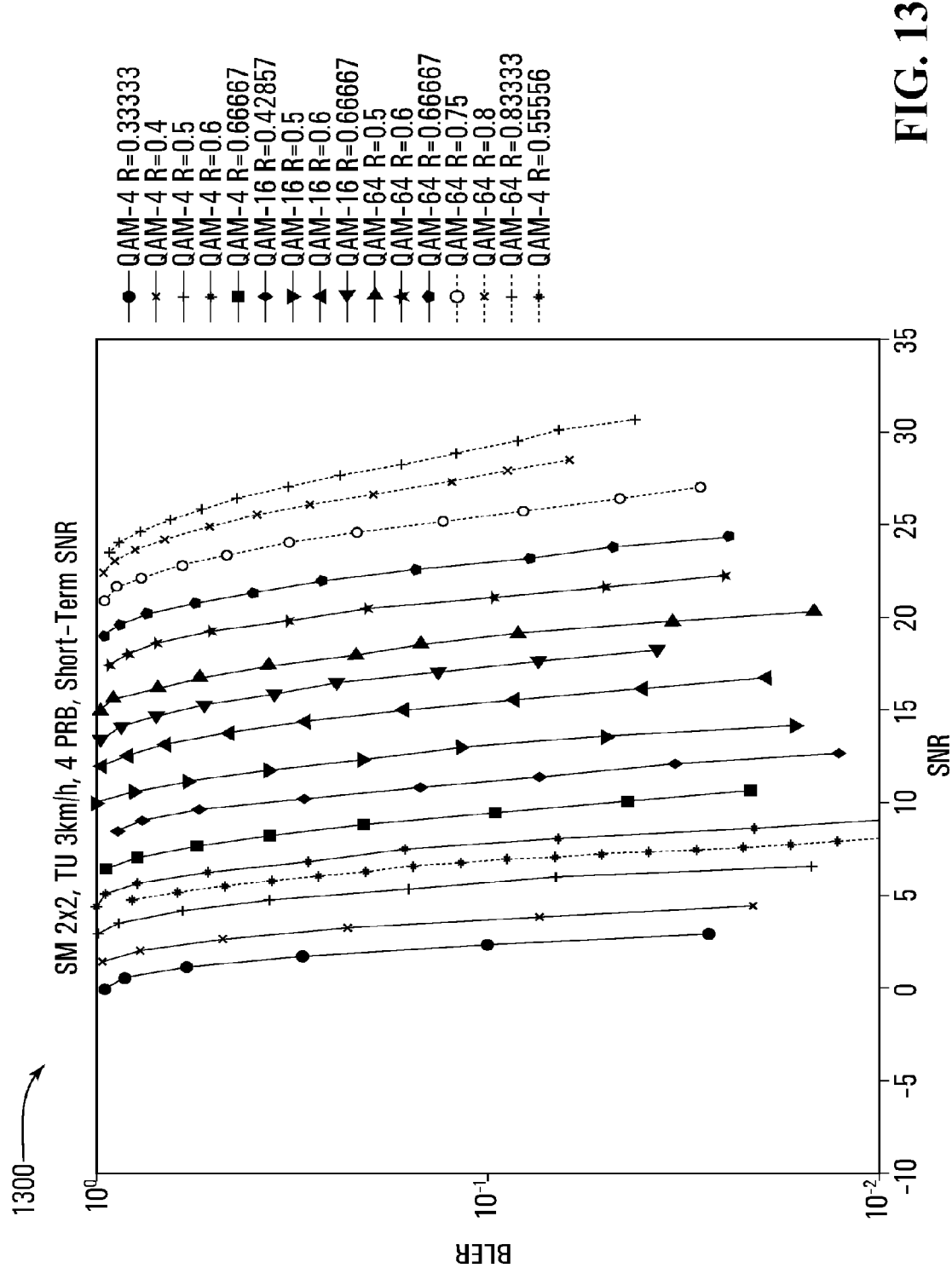
FIG. 13 is a diagram of representative BLER vs. SNR curves for 16-entry CQI table for SM in a fading channel according to some embodiments.

FIG. 12 is a respective 16-entry CQI table 1200 for Spatial Multiplexing (SM) in a fading channel according to some embodiments. This table was generated by a set of link level BLER vs. SNR curves for fading channel which cover the working SNR range from 3 dB to 30 dB equally with a step of approximately 1.5 dB, in which spatial multiplexing mode is assumed. FIG. 13 is a diagram of the corresponding link level BLER vs. SNR curves 1300 for the 16-entry CQI table 1200 for SM in fading channel shown in FIG. 12.

Figure 16:
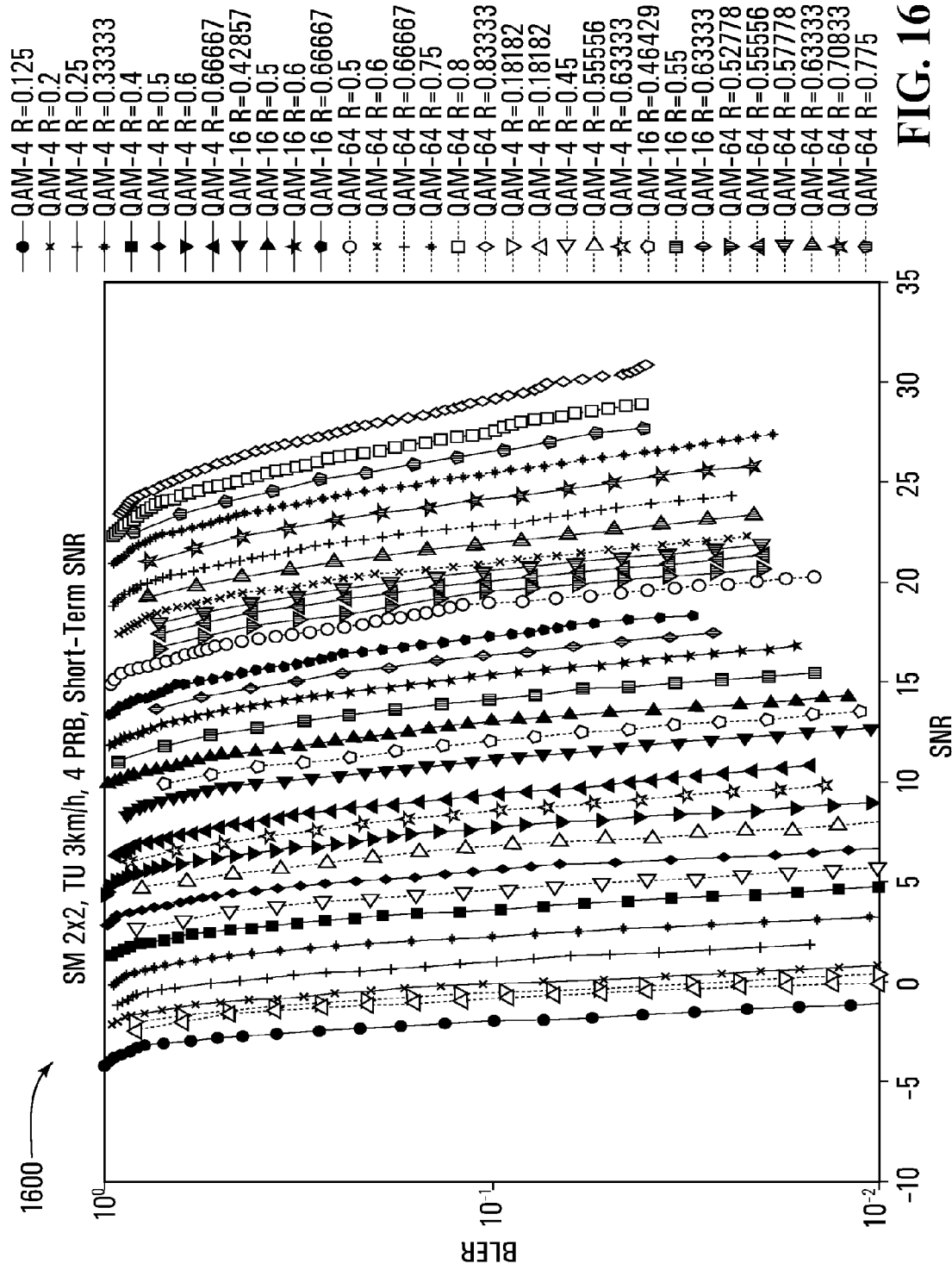
FIG. 16 is a diagram of representative BLER vs. SNR curves for 32-entry CQI table for SM in a fading channel according to some embodiments.

FIGS. 14 and 15 are a representative 32-entry CQI table 1400/1500 for SM in a fading channel according to some embodiments. This table was generated by a set of link level BLER vs. SNR curves for fading channel which cover the working SNR range from −2 dB to 30 dB equally with a step of approximately 1 dB, in which spatial multiplexing mode is assumed. FIG. 16 is a diagram of the corresponding link level BLER vs. SNR curves 1600 for the 32-entry CQI table 1400/1500 for SM in fading channel shown in FIGS. 14 and 15.

Figure 19:
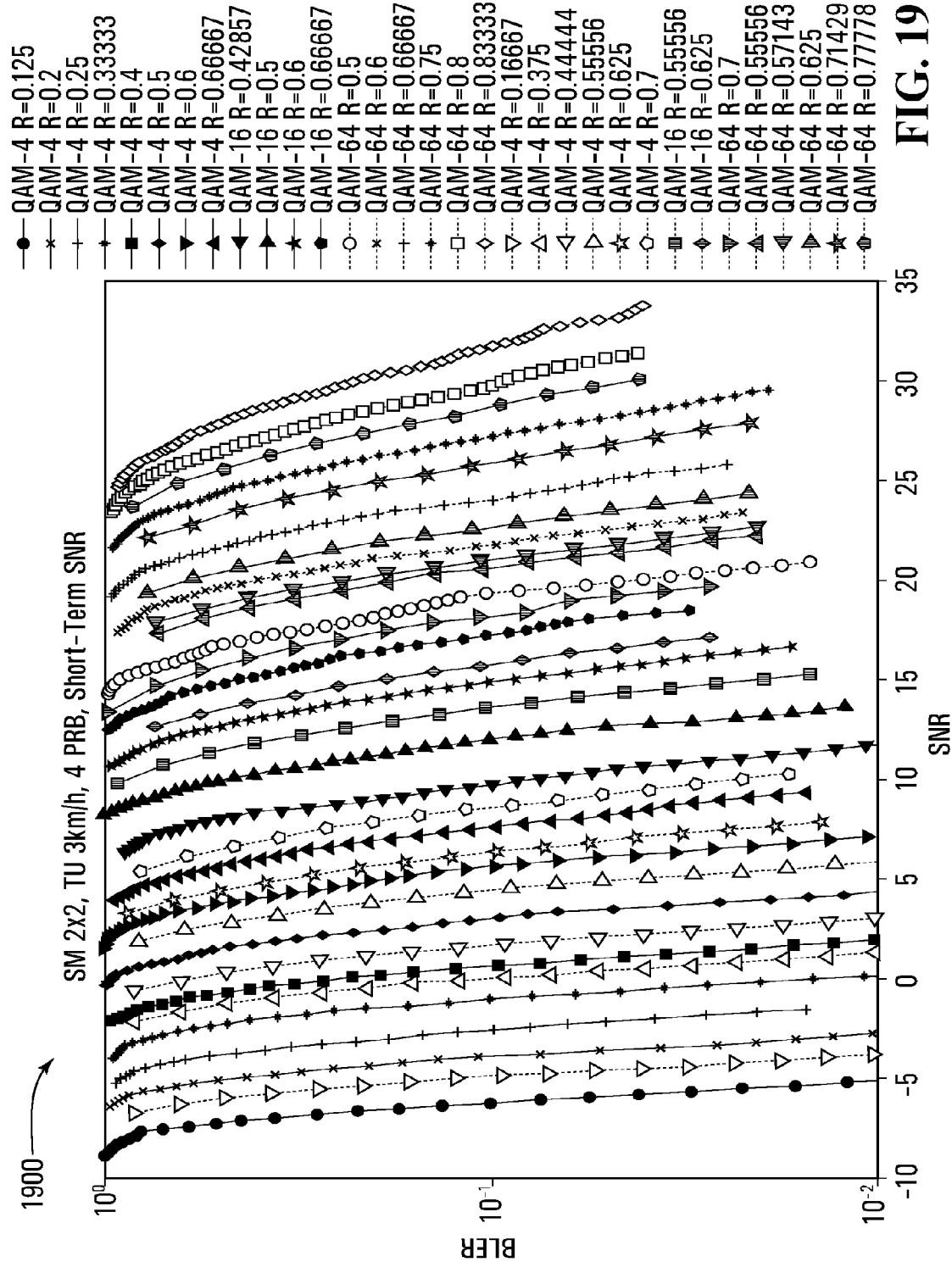
FIG. 19 is a diagram of representative BLER vs. SNR curves for Alternative 32-entry CQI table for SM in a fading channel according to some embodiments.

FIGS. 17 and 18 are a representative alternative 32-entry CQI table 1700/1800 for SM in fading channel according to some embodiments. This table was generated by a set of link level BLER vs. SNR curves for fading channel which cover the working SNR range from −2 dB to 30 dB with less implementation complexity, in which the spatial multiplexing mode is assumed. FIG. 19 is a diagram of the corresponding BLER vs. SNR curves 1900 for the alternative 32-entry CQI table 1700/1800 for SM in fading channel shown in FIGS. 17 and 18.

The number of MCS levels (which corresponds to the number of MCS indices) in a CQI table is referred to as the size of the table. The desired size of a CQI table can depend on design factors such as the desired SNR working range and feedback overhead for a particular implementation or deployment scenario. CQI tables may be generated having different sizes and for different SNR working ranges. Tables of different sizes and different SNR working ranges may avoid unnecessary CQI feedback overhead depending on a particular scenario. The optimal CQI table size or SNR working range is implementation specific. The CQI tables shown in FIGS. 4, 6-7, 9-10, 12, 14-15, and 17-18, for example, have sizes of 16, 25, and 32 entries. According to some embodiments, at least two of the plurality of CQI tables provided in a wireless communications system have different sizes for different SNR working ranges.

CQI tables may be designed to be performance or complexity-oriented. For optimal performance, the MCS set utilized in a CQI table may be chosen in order to provide a suitable MCS level at equal SNR steps. For example, at a given BLER, such as 1 o-\ the MCS set may be chosen so that BLER v. SNR curves (each curve corresponding to an MCS level in the MCS set) will be somewhat equally spaced at the given BLER, as shown in FIG. 3 for example. However, some MCS sets are less complex to implement than others. For example, some MCS level code rates may be difficult to achieve and may lead to greater implementation complexity. Therefore, to reduce implementation complexity, an "easy-implemented" MCS set, which includes code rates that are easily achieved, can be chosen. The CQI tables proposed in this disclosure may be suitable to different channel statistics and/or different MIMO modes, and are optimized based on either performance or implementation complexity.

A method of a base station selecting one of a plurality of CQI tables which are generated for according to the methods described above, as well as a corresponding apparatus, will now be described in detail.

A base station may select one of a plurality of CQI tables generated by the methods described above for use in communication with user equipment. Each table may be optimized for a different possible scenario, and the base station may improve performance by selecting a CQI table which best fits the communication conditions between the base station and user equipment. To this end, a set of CQI tables generated in accordance with the methods described above may be stored at the base station and user equipment. The base station may select between the stored CQI tables, depending on channel conditions or implementation requirements received by or otherwise known to the base station. Such channel conditions may include an estimated channel statistic, sub-channel assignment of the user equipment by the base station; and/or MIMO transmission mode. Implementation requirements may include a desired implementation complexity and/or CQI feedback overhead requirements.

Figure 20:
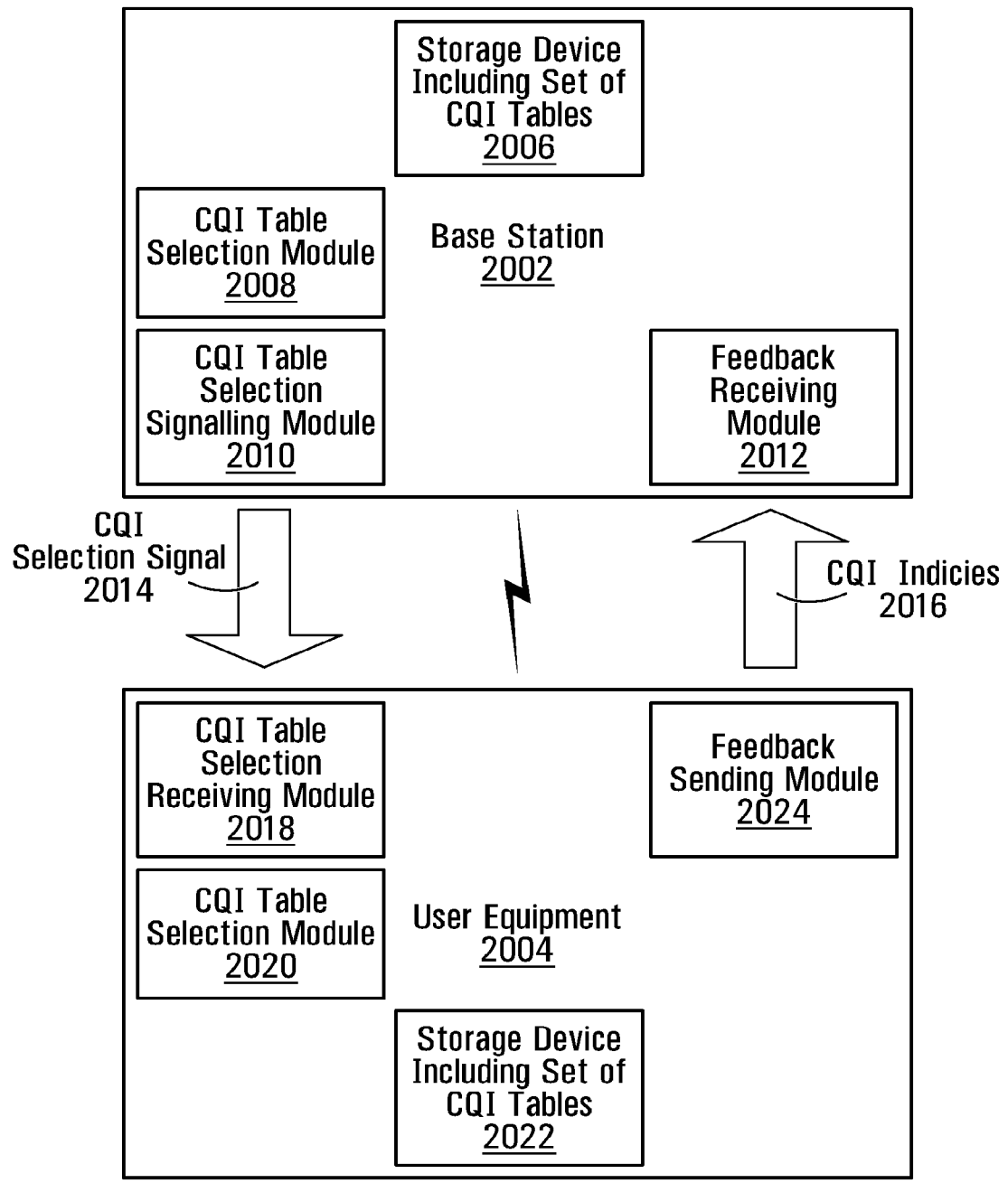
FIG. 20 illustrates a block diagram of a base station and user equipment in a wireless communication system according to some embodiments.

FIG. 20 illustrates a block diagram of a base station and user equipment in a wireless communication system according to some embodiments. FIG. 20 shows a base station 2002 and user equipment 2004. Base station 2002 comprises: storage device 2006; CQI selection module 2008; CQI table selection signaling module 2010; and feedback receiving module 2012. User equipment 2004 comprises: CQI table selection receiving module 2018; CQI table section module 2020; storage device 2022; and feedback sending module 2024.

In operation, base station 2002 communicates with at least one user equipment 2004. Storage devices 2006 and 2022 may store a set of CQI tables, which may be generated in the manner described herein and stored at the base station 2002 and user equipment 2004. The CQI tables may be pre-entered into both storage device 2006 and storage device 2022 during manufacturing of base station 2002 and user equipment 2004. Alternatively, the CQI tables may be pre-entered in storage device 2006 and subsequently downloaded from base station 2002 by user equipment 2004 when user equipment 2004 is initialized upon entering the wireless system. At initialization, user equipment 2004 may perform a handshake with base station 2002 to exchange some initial information and establish user equipment 2004 in the wireless system. As part of the handshake process, CQI tables may be downloaded to user equipment 2004 and stored at storage device 2022.

Each of the CQI tables stored at base station 2002 and user equipment 2004 may be generated for a different possible channel statistic and/or MIMO transmission mode in accordance with methods described herein. Therefore, the base station 2002 may improve performance by selecting the appropriate CQI table for communication with user equipment 2004. CQI selection module 2008 may select one of the CQI tables stored in storage device 2006. As described herein, CQI tables contain CQI indices that may be defined by respective maximum MCS levels supported by respective SNR values. By selecting a table which best matches current channel conditions for use in communication between base station 2002 and user equipment 2004, base station 2002 may determine more accurate information regarding actual maximum MCS levels supported based on feedback from user equipment 2004. System performance may, therefore, be increased.

Base station 2002 can select a CQI table, for use in communication with user equipment 2004 that best fits an estimated channel statistic. Base station 2002 can estimate channel statistic information based on feedback from user equipment 2004. Alternatively, user equipment 2004 can estimate the channel statistic and transmit the estimation to base station 2002.

The Base station 2002 may also select a CQI table on based on the MIMO transmission mode. The MIMO transmission configuration may be determined by base station 2002 based on user equipment 2004 channel statistics and SNR. For example, if SNR feedback from user equipment 2004 is very low or a channel has little scattering, base station 2002 could use transmit diversity (TxD) configuration and corresponding CQI tables for that user equipment 2004. If SNR feedback from user equipment 2004 is quite high or a channel has rich scattering, spatial multiplexing configuration and corresponding CQI tables could be used for that user equipment 2004. As described herein, different CQI tables can be generated for different possible MIMO transmission modes. Therefore, base station 2002 can select a CQI table, for use in communication with user equipment 2004 that best fits the current MIMO transmission mode.

Base station 2002 may also decide which CQI table to use based on sub-channel assignments. Sub-channel assignment is how a base station assigns time and frequency resources to user equipment for transmitting its data. There are, in general, two types of sub-channel assignments, one is localized sub-channel and the other is distributed sub-channel. Localized sub-channel refers to assignment of contiguous time and frequency resources, while distributed sub-channel refers to assignment of non-contiguous time and frequency resources spreading across the whole bandwidth. The different CQI tables could be associated with sub-channel assignments. For example, if a localized sub-channel is assigned to user equipment 2004, a CQI table generated for AWGN channel could be used, while if a distributed sub-channel is assigned to user equipment 2004, a CQI table corresponding to the fading channel could be used.

The selection of a CQI table by base station 2002 may also be made based on implementation requirements such as a desired implementation complexity and CQI feedback overhead requirements. As discussed herein, different CQI tables can be generated for different possible implementation complexity. Some code rates may be difficult to achieve and may lead to greater implementation complexity. Therefore, a CQI table may be chosen based on the implementation complexity required to achieve code rates of MCS levels contained in the table. Also, tables of different sizes can be generated which may require different CQI feedback overhead. Therefore, base station 2002 can select a CQI table, for use in communication with user equipment 2004 that best fits implementation complexity and CQI feed back overhead requirements.

User equipment 2004 may measure CQI such as SNR and feed back CQI information to base station 2002. Therefore, the CQI table selection may be communicated to user equipment 2004 so that user equipment 2004 can utilize the proper CQI table when feeding back CQI information. CQI table selection signaling module 2010 transmits CQI selection signal 2014, which indicates the selected CQI table, to at least one user equipment 2004. The CQI selection signal 2014 is received by the CQI table selection receiving module 2018, and CQI table selection module 2020 selects the proper CQI table stored at storage device 2022 based on the received signal 2014. User equipment 2004 may periodically or aperiodically measure CQI and can utilize the selected CQI table for sending CQI information to base station 2002. CQI indices 2016 from the selected CQI table, which correspond to the measured CQI, are transmitted from user equipment 2004, via feedback sending module 2024, to base station 2002. CQI indices 2016 are received at the base station 2002 by feedback receiving module 2012.

In some embodiments, CQI table selection is performed relatively infrequently compared to how often the user equipment measures and feeds back CQI. CQI feedback from user equipment may be sent more often as the CQI information is used for channel measurement. The selection of CQI table signal may be sent from a high layer, rather than a physical layer. The high layer may refer to a protocol layer above a physical layer. The signaling initiated from the high layer may be sent less frequently than those initiated from the physical layer and may therefore take less overhead. Selection of a CQI table may be done on a per transmission basis, meaning the selected CQI table won't be changed through the whole transmission.

Figure 21:
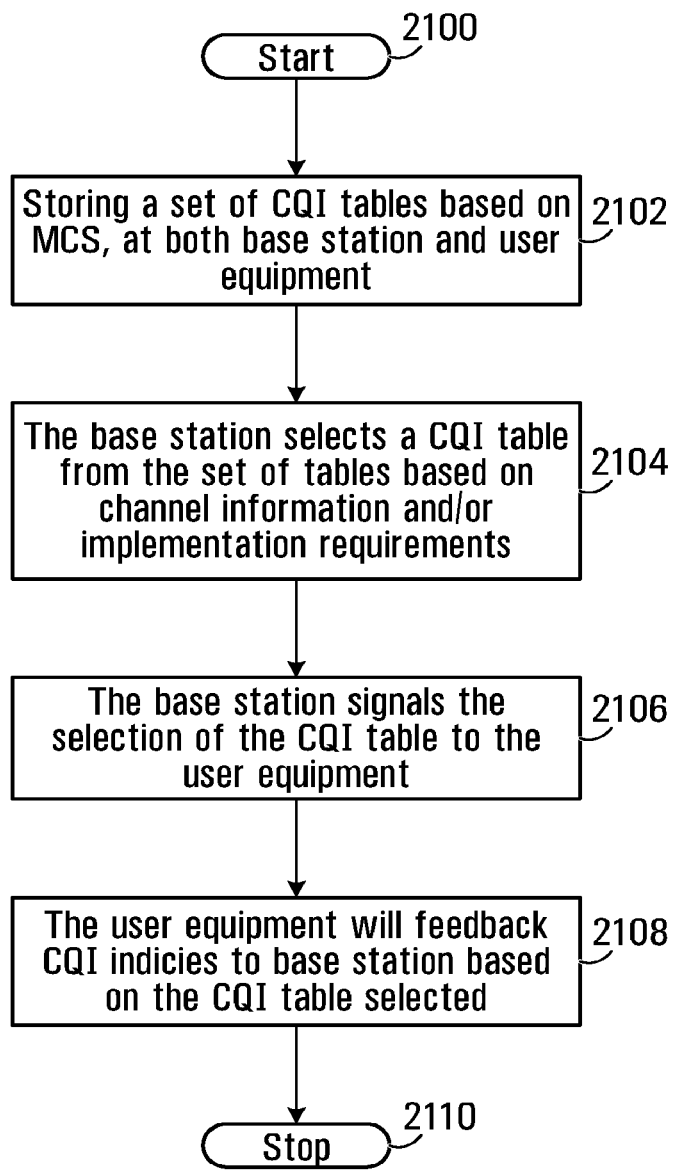
FIG. 21 is a flowchart of steps for operating a base station and user equipment according to some embodiments.

FIG. 21 is a flowchart of steps for operating a base station and user equipment according to some embodiments. At step 2100 the process begins. At step 2102, a set of CQI tables based on an MCS set is stored at both a base station and at least one user equipment. At step 2104, the base station selects a CQI table from the set of stored tables in the manner described herein. The CQI table may be selected to suit certain channel conditions and implementation requirements received by or otherwise known by the base station. Channel conditions may include a channel statistic, MIMO transmission mode, and/or sub-channel assignment Implementation requirements may include a required implementation complexity and/or CQI feedback overhead. At step 2106, the base station signals the selection of the CQI table to the user equipment. The user equipment can conduct periodical or aperiodical measurements of CQI values and derive CQI indices from the selected CQI table based on the configurations from the base station. At step 2108, the user equipment feeds back CQI indices to the base station, periodically or aperiodically, based on the selected CQI table in order to provide CQI information to the base station. At step 2110, the process ends.

Some embodiments described herein utilize multiple CQI tables, where each CQI table is generated for a different channel statistic (AWGN or fading channel) and/or MIMO configuration. It is also possible to use multiple CQI tables to form one compound CQI table.

CQI tables based on the same MCS set, but generated for different channel statistics or MIMO modes, may have equivalent SNR working points (i.e. discrete SNR values corresponding to MCS indices), except entries at or near MCS switching points. An MCS switching point is the point in a CQI table at which two adjacent MCS levels correspond to a different modulation order, such as QPSK and 16QAM.

In some embodiments, different CQI tables can be formed into one compound CQI table. In such a compound CQI table, one MCS level on one side of an MCS switching point may share the same, or substantially the same, spectral efficiency as one MCS level on the other side of the same MCS switching point. It is also possible that more than one pair of MCS level on each side of an MCS switching point in would share the same, or substantially the same, spectral efficiency.

In one embodiment, different CQI tables can be formed into one compound CQI table in such a way that it contains at least one MCS index which corresponds to multiple MCS levels at or near the MCS switching points ("one-to-multiple" compound CQI table). There may, therefore, exist one CQI index corresponding to multiple MCS levels. Each of the multiple MCS levels may have different modulation order but the same, or similar, spectral efficiency. In other embodiments, different CQI tables can be formed into one compound CQI table in such a way that there exists one MCS index to one MCS level ("one-to-one" compound CQI table). Some MCS levels in a "one-to-one" compound CQI table may have the same spectral efficiency but a different modulation order and code rate.

FIG. 22 is a representative example "one-to-multiple" compound CQI table 2200 according to some embodiments. As can be seen in the FIG. 22, MCS indices 5 and 11 correspond to multiple MCS levels at MCS switching points. MCS index 5 corresponds to a first MCS level comprising QPSK modulation with a code rate of ⅔, and a second MCS level comprising 16QAM modulation and a code rate of ⅓. Both MCS levels corresponding to MCS index have an effective rate of 1.33. MCS index 11 corresponds to a first MCS level comprising 16QAM modulation with a code rate of ⅘, and a second MCS level comprising 64QAM modulation and a code rate of 8/15. Both MCS levels corresponding to MCS index 11 have an effective rate of 3.20.

FIG. 23 is a representative example "one-to-one" compound CQI table 2300 according to some embodiments. As can be seen in the FIG. 23, MCS indices 5 and 6 each correspond to one MCS level at an MCS switching point, as do MCS indices 12 and 13. MCS index 5 corresponds to an MCS level comprising QPSK modulation with a code rate of ⅔. MCS index 6 corresponds to an MCS level comprising 16QAM modulation and a code rate of ⅓. Both MCS levels corresponding to MCS indices 5 and 6 have an effective rate of 1.33. MCS index 12 corresponds to an MCS level comprising 16QAM modulation with a code rate of ⅘. MCS index 13 corresponds to an MCS level comprising 64QAM modulation and a code rate of 8/15. Both MCS levels corresponding to MCS indices 12 and 13 have an effective rate of 3.20.

The example "one-to-multiple" and "one-to-one" compound CQI tables shown in FIGS. 22 and 23, respectively, illustrate representative examples of overlapping spectral efficiencies at MCS switching points in a compound CQI table. These tables should not necessarily be taken to be examples of optimization for any particular channel statistics, MIMO transmission modes, performance or implementation complexity.

Figure 24:
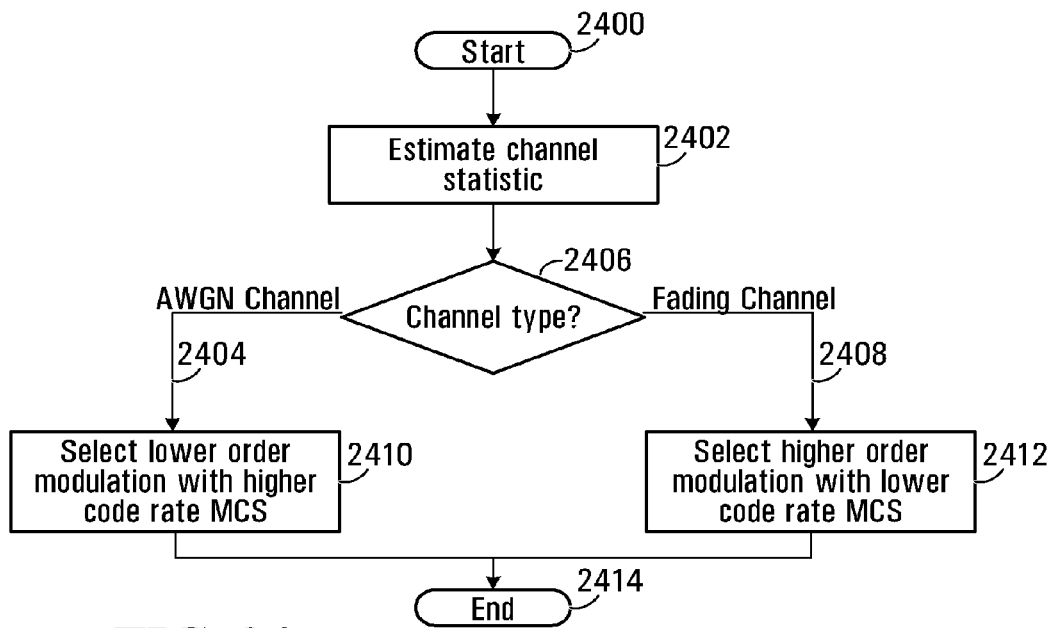
FIG. 24 is a flowchart of steps for MCS selection utilizing a compound CQI table according to some embodiments.
Figure 25:
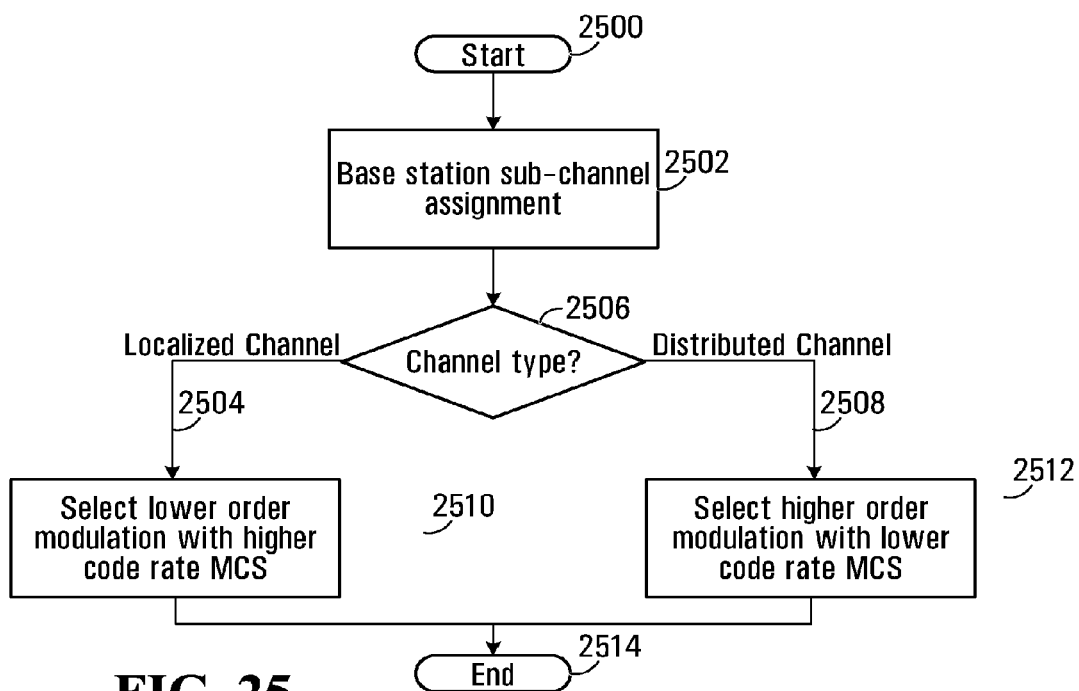
FIG. 25 is a flowchart of steps for MCS selection utilizing a compound CQI table according to some embodiments.

FIGS. 24 and 25 are flowcharts of steps in some embodiments that provide possible guidelines for selecting from multiple MCS levels with the same spectral efficiency. The steps in the flowcharts shown in FIGS. 24 and 25 may be implemented using either a "one-to-one" or "one-to-multiple" compound CQI table.

FIG. 24 is a flowchart of steps for MCS selection utilizing a compound CQI table according to some embodiments. At step 2400, the process begins. At step 2402, a channel statistic is estimated. Either the base station can estimate the channel statistic, or the user equipment can estimate the channel statistic and transmit the estimation to the base station. In FIG. 24, for example, the channel statistic 2406 is shown to be either AWGN channel 2404 or fading channel 2408. At step 2410, if the channel 2406 is estimated as an AWGN channel 2404, the MCS level with lower order modulation and higher code rate may be selected. Otherwise, at step 2412, the MCS lower with higher order modulation and lower code rate may be selected. At step 2414, the process stops. As will be appreciated by one skilled in the art, the method shown in FIG. 24 is an illustrative example, and other channel statistics and selection criteria may be used for various scenarios using a "one-to-multiple" compound CQI table.

FIG. 25 is a flowchart of steps for MCS selection utilizing a compound CQI table according to some embodiments. At step 2500, the process begins. At step 2502, the base station first decides the sub-channel assignment to the user equipment. In FIG. 25, for example, the sub-channel assignment 2506 is shown to be either localized channel 2504 or distributed channel 2508. At step 2510, if the sub-channel assignment 2506 is a localized channel 2504, the MCS level with lower order modulation and higher code rate may be selected. At step 2512, if the sub-channel assignment 2506 is a distributed channel 2508, the MCS level with higher order modulation and lower code rate may be selected. At step 2514, the process stops. As will be appreciated by one skilled in the art, the method shown in FIG. 25 is an illustrative example, and other channel statistics and selection criteria may be used for various scenarios using a "one-to-one" compound CQI table.

The methods and apparatuses described above may be designed to be implemented in a 3rd Generation Partnership Project (3GPP) Long Term Evolution (LTE) system.

What has been described is merely illustrative of the application of the principles of some embodiments. Other arrangements and methods can be implemented by those skilled in the art without departing from the spirit and scope of the present invention.

What is claimed is:

1. A method comprising:
   forming by computing equipment a compound table including a plurality of individual channel quality indicator (CQI) tables generated for distribution to base stations and user equipment of a wireless communication system according to a set of block error rate (BLER) versus signal to noise ratio (SNR) curves, each table comprising a set of indices, each index corresponding to a respective modulation and coding scheme (MCS) level and to a respective measured signal-to-noise ratio, and
   for each table, the MCS levels being chosen based on expected block error rates for a respective channel statistic and/or Multiple-Input Multiple-Output (MIMO) transmission mode.

2. The method of claim 1, wherein at least two of the plurality of tables have different sizes and are generated for different SNR working ranges.

3. The method of claim 1 wherein the MCS levels are chosen:
   to provide approximately equal coverage over a desired signal-to-noise ratio working range; and/or
   to define a MCS set which contains code rates which may be implemented with a desired implementation complexity.

4. The method of claim 1, further comprising storing the compound table in a base station and in one or more user equipment, wherein the one or more user equipment is in wireless communication with the base station.

5. The method of claim 1, wherein at least one of a set of indices in the compound table corresponds to a plurality of MCS levels, and the corresponding plurality of MCS levels have substantially the same spectral efficiency.

6. The method of claim 1, wherein each of a set of indices in the compound table corresponds to one MCS level, and at least two of the MCS levels have substantially the same spectral efficiency.

7. The method of claim 1, wherein the MCS levels in the tables define MCS sets suitable for a 3rd Generation Partnership Project (3GPP) Long Term Evolution (LTE) system.

8. A method of operating a wireless communication system comprising:
  storing a compound table having a plurality of individual channel quality indicator (CQI) tables at a base station and one or more user equipment, the tables generated according to a set of block error rate (BLER) versus signal to noise ratio (SNR) curves, each table comprising a set of indices, each index corresponding to a respective modulation and coding scheme (MCS) level and to a respective measured signal-to-noise ratio, and
  for each table, the MCS levels being chosen based on expected block error rates for a respective channel statistic and/or Multiple-Input Multiple-Output (MIMO) transmission mode; and
  the base station selecting one of the plurality of tables for use in communication with the one or more user equipment;
  the base station signalling the selection of the table to the one or more user equipment; and
  the one or more user equipment measuring CQI values and feeding back indices corresponding to the measured CQI values to the base station based on the selected table.

9. The method of claim 8, wherein selecting one of the plurality of tables comprises:
  the base station determining a channel condition between the base station and the one or more user equipment, said channel condition including an estimated channel statistic, sub-channel assignment, and/or MIMO transmission mode; and
  the base station selecting one of the plurality of tables, wherein said selected table is generated for said channel condition.

10. The method of claim 8, wherein selecting one of the plurality of tables comprises:
  the base station receiving or otherwise knowing implementation requirements, said implementation requirements including implementation complexity and/or CQI feedback overhead requirements; and
  the base station selecting one of the plurality of tables, wherein said selected table is generated for said implementation requirements.

11. The method of claim 8, further comprising the base station selecting a MCS level for communication with the one or more user equipment on the basis of the indices fed back from the one or more user equipment.

12. The method of claim 8, wherein at least one index in the compound table corresponds to a plurality of MCS levels, and the corresponding plurality of MCS levels have substantially the same spectral efficiency.

13. The method of claim 12, wherein the steps of the base station selecting one of the tables and selecting a MCS level comprise selecting one of the plurality of MCS levels with substantially the same spectral efficiency from the compound table.

14. The method of claim 8, wherein each index in the compound table corresponds to one MCS level, and at least two of the MCS levels have substantially the same spectral efficiency.

15. The method of claim 14, wherein the steps of the base station selecting one of the tables and selecting a MCS level comprise selecting one of the plurality of MCS levels with substantially the same spectral efficiency from the compound table.

16. The method of claim 8, wherein the MCS levels in the tables define MCS sets suitable for a 3rd Generation Partnership Project (3GPP) Long Term Evolution (LTE) system.

17. An apparatus in a base station, the apparatus comprising
  a storage device for storing a compound table including a plurality of individual channel quality indicator (CQI) tables generated according to a set of block error rate (BLER) versus signal to noise ratio (SNR) curves, each table comprising a set of indices, each index corresponding to a respective modulation and coding scheme (MCS) level and to a respective measured signal-to-noise ratio, and for each table, the MCS levels being chosen based on expected block error rates for a respective channel statistic and/or Multiple-Input Multiple-Output (MIMO) transmission mode;
  a module for selecting one of the plurality of tables;
  a module for signalling the selection of the table to at least one user equipment; and
  a module for receiving CQI indices from the selected table fed back from the at least one user equipment.

18. The apparatus of claim 17, wherein the module for selecting one of the plurality of tables is configured to select a table generated for a channel condition determined by the base station, said channel condition including an estimated channel statistic, sub-channel assignment, and/or MIMO transmission mode.

19. The apparatus of claim 17, wherein the module for selecting one of the plurality of tables is configured to select a table generated for implementation requirements received or otherwise known by the base station, said implementation requirements including implementation complexity and/or CQI feedback overhead requirements.

20. The apparatus of claim 17, wherein the apparatus is configured for use in a 3rd Generation Partnership Project (3GPP) Long Term Evolution (LTE) system.

* * * * *